UNITED STATES PATENT OFFICE.

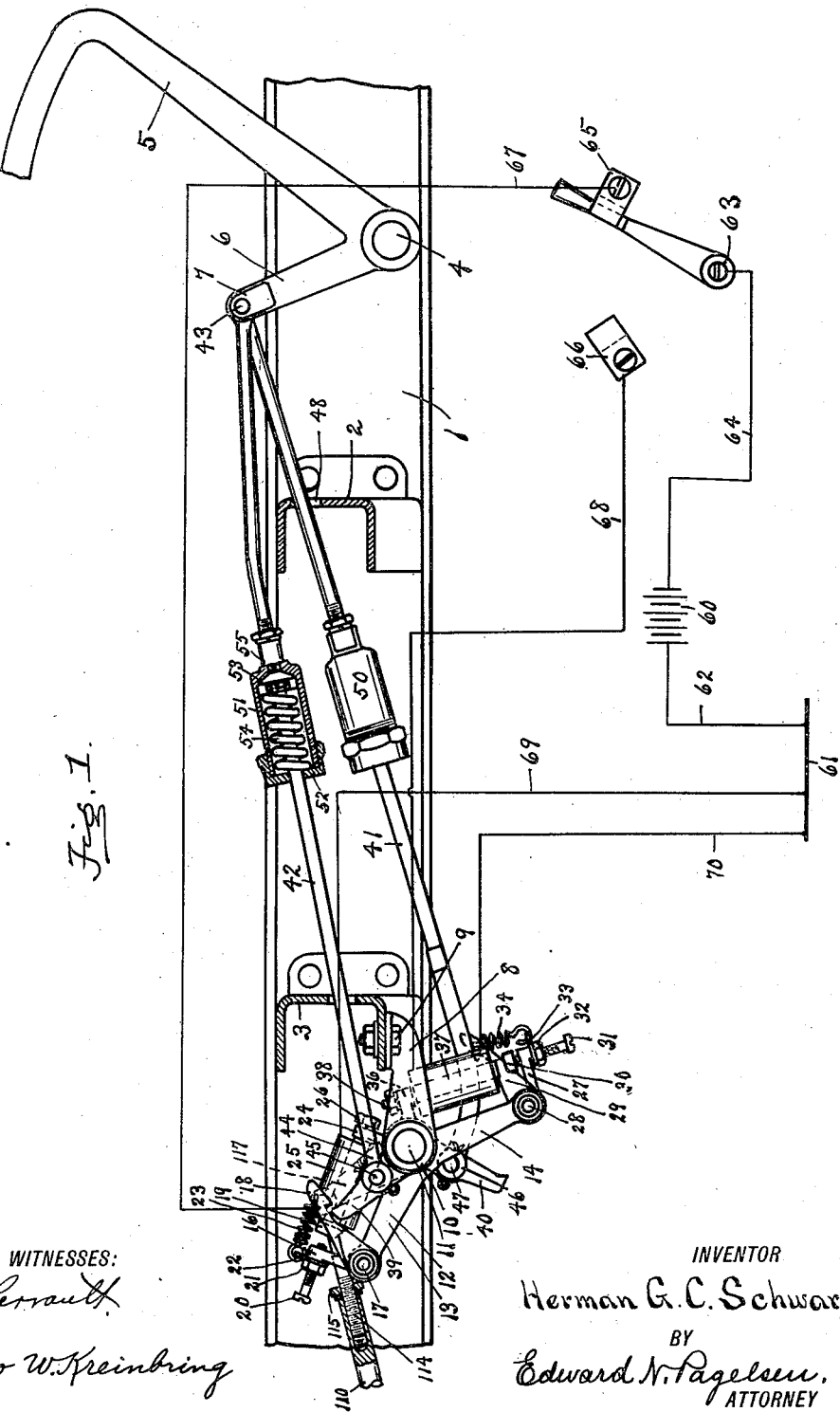

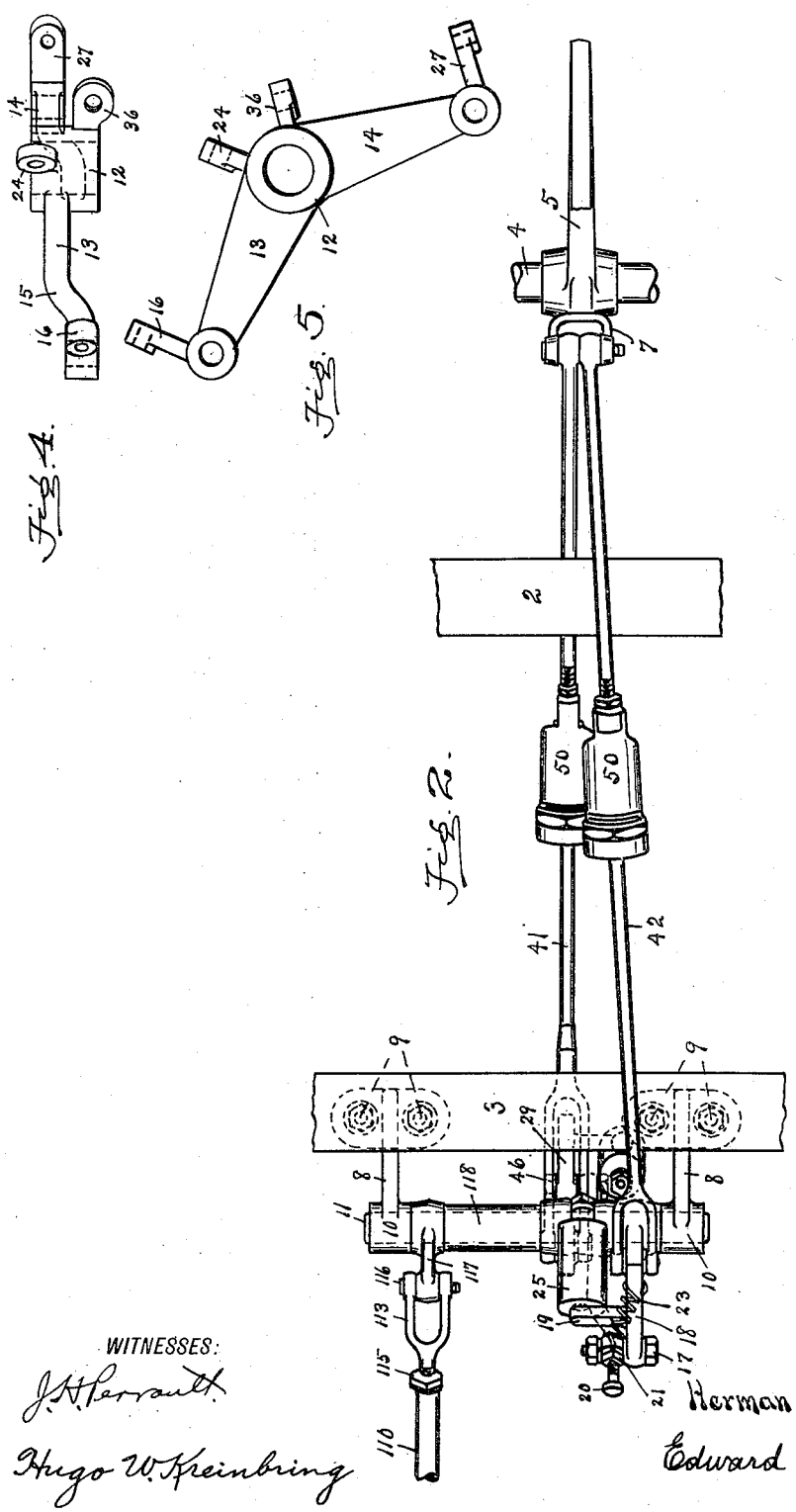

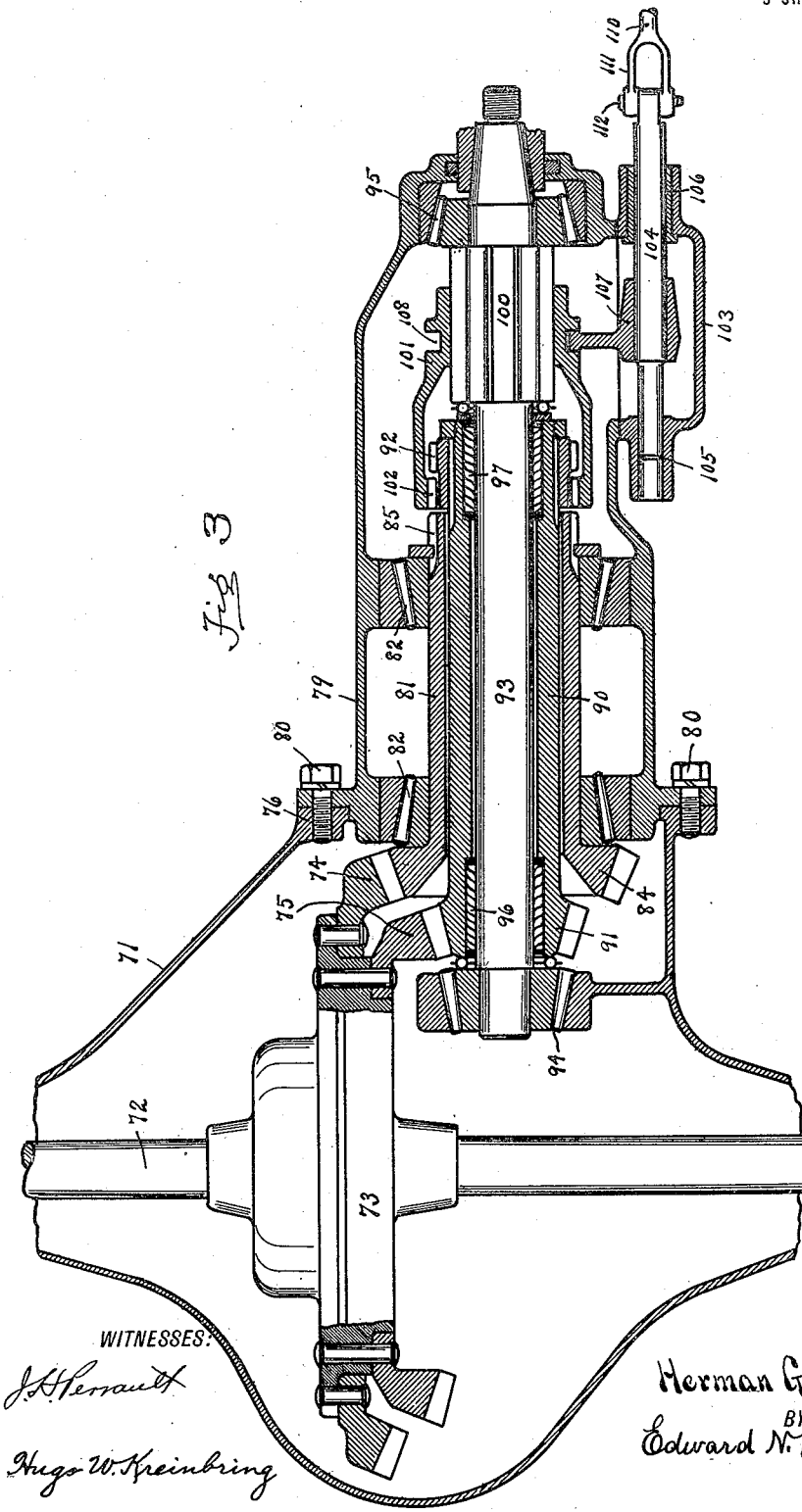

HERMAN G. C. SCHWARZE, OF DETROIT, MICHIGAN.

SPEED-CHANGING MECHANISM.

1,139,078.  Specification of Letters Patent.  Patented May 11, 1915.

Application filed September 26, 1913. Serial No. 791,909.

*To all whom it may concern:*

Be it known that I, HERMAN G. C. SCHWARZE, a citizen of the United States, and a resident of Detroit, in the county of Wayne and State of Michigan, have invented a new and useful Speed-Changing Mechanism, of which the following is a specification.

This invention relates to a speed changing mechanism for the driving gears of motor vehicles, and it consists in an electromagnetic device that is controlled by means of a switch mounted convenient for the driver.

This invention consists, in combination of a plurality of driving gears and an operating device for causing the engagement of one or the other of these gears with the motor of the vehicle according to the direction in which this operating device is moved, of an actuating member movable in one direction by the driver, a selecting-coupling member to properly connect the actuating device to the operating device so that the latter may be moved in either direction by the former, and an indicator-controller for governing the action of the selecting-coupling device.

It further consists in the arrangement of the magnetic connectors and the pivoted dogs, whereby the gears are shifted.

It also consists in the novel details of construction shown in the accompanying drawings and particularly pointed out in the appended claims.

In the accompanying drawings, Figure 1 is a vertical longitudinal section through the chassis of a motor vehicle, showing the speed changing mechanism in position. Fig. 2 is a plan of the same. Fig. 3 is a horizontal section showing a two-speed driving mechanism with which this speed changing mechanism may be used. Figs. 4 and 5 are details of the double crank member.

Similar reference characters refer to like parts throughout the several views.

It has heretofore been the practice to use a lever for the purpose of moving the selected gears necessary to drive motor vehicles at various speeds, and this lever, together with the other levers necessary for the operation of the mechanism of the vehicle, have been placed in various positions adjacent the driver, generally within reach of his right hand. The result has been that very often the wrong lever was operated, resulting in serious accidents, and that in many types of vehicles, entrance at one side of the front seat is absolutely prevented. These difficulties are obviated to a large extent by the present invention which eliminates one of these levers.

In the drawings, one of the side bars 1 of the chassis is shown broken away and the cross bars 2 and 3 are shown in section. Between the side bars 1 is mounted a shaft 4 to which is connected the clutch-pedal 5, having formed integrally with it an arm 6, preferably having a yoked upper end 7.

Two brackets 8 depend from the cross-bar 3 and may be secured thereto by the bolts 9. These brackets carry the bearings 10 for the cross-shaft 11 at their outer ends. Rigidly secured to the shaft 11 is a double crank 12 which has two arms 13 and 14 that extend in nearly opposite directions from the shaft as shown in Fig. 5.

The arm 13 is bent laterally, as indicated at 15 in Fig. 4, and is provided with an extension 16 that projects at about right angles from the arm. The arm is bored out at or near the apex of the right angle for a bolt or pin 17, upon which the latch 18 is pivotally mounted, which latch is provided with an armature 19. The extension 16 carries an adjusting screw 20, set nut 21, and washer 22. The screw 20 is adapted to contact with the armature 19 and to limit the movement of latch 18 toward the extension 16. A tension spring 23 connects the washer 22 with the outer extremity of the latch 18 and normally tends to hold the latch outward. A bracket 24, connected to the double crank 12, adjustably supports the electromagnet 25, a bolt 26 securing the magnet in position. One pole of the electro-magnet is adjacent to the armature 19.

The arm 14 of the double crank 12 is provided with elements whose construction is similar to those already described with reference to the arm 13. The extension 27 projects forwardly at about a right angle from the general direction of the arm 14, and the arm supports the bolt or pin 28 upon which the latch 29, carrying the armature 30, is pivotally mounted. The extension 27 supports an adjusting screw 31, set nut 32, and washer 33, corresponding to the elements 20, 21 and 22 previously described. The outer end of the latch 29 is connected to the collar 33 by means of the tension spring 34. The bracket 36 is connected to the double crank 12, and upon this bracket the electromagnet 37 is adjustably secured, as, for example, by the bolt 38.

The dog 39 is journaled upon shaft 11 so as to swing in the plane of the latch 18, and the dog 40 is similarly mounted on this shaft 11 so as to swing in the plane of the latch 29; and the arrangement is such that when either of the armatures 19 or 30 is drawn toward its respective magnet, and with it the latch 18 or 29, the corresponding dog, upon being swung forwardly about the shaft 11, engages with the hooked end of the adjacent latch.

Rods 41 and 42 serve to connect the arm 6 of the clutch pedal 5 with dogs 39 and 40, respectively. Both rods 41 and 42 may be joined to the fork 7 by the pin 43. The rod 42 may be bent to clear the cross bar 2, and has a bifurcated end 44 pivotally connected to the dog 39 by means of the pin 45. The rod 41 is likewise provided with a bifurcated end 46, which connects to the dog 40 by means of the pin 47. The rod 41 may pass through a hole 48 in the cross bar 2.

The connecting rods 41 and 42 may each be made in two sections, joined by safety or cushioning devices, indicated as a whole by 50. Each of these devices consists of a hollow cylinder 51, screwed at 55 onto the threaded end of one of the sections, and into which cylinder the other section extends through a perforated screw-cap 52. A nut 53 on the end of this section engages the compression spring 54 which engages the cap 52. The object of this safety device is to prevent the breaking of the latches, crank arms and dogs in case the gear shifting mechanism cannot be operated.

The circuits for energizing the electro-magnets 25 and 37 will now be described. 60 indicates any desired source of current, one pole of which is preferably grounded on the frame 61 of the vehicle by means of the wire 62. The other pole is connected by the wire 64 to the pivot of the bar of any ordinary two-way switch as indicated at 63, which switch may be mounted wherever desired. Contacts 65 and 66 and wires 67 and 68 serve, respectively, to connect the switch bar with the electro-magnets 25 and 37, which are respectively electrically connected with the vehicle frame by wires 69 and 70.

Any suitable means (not shown) may be provided to hold the switch in central position.

Referring particularly to Fig. 3, 71 is the rear axle casing of the vehicle; 72 is the rear axle; and 73 is the main gear of the differential. The gear ring 73 has rigidly secured to it the high speed bevel gear 74, and low-speed bevel gear 75. The gear casing 71 has formed thereon a cylindrical flange 76 which carries an auxiliary casing 79, secured to the main casing by bolts 80.

Within the casing 79, the sleeve 81 is mounted in the roller bearings 82. This sleeve is provided at one end with a bevel gear 84 that meshes with the gear 74, and at the other end with the clutch member 85. A second sleeve 90 is mounted to rotate within the sleeve 81 and is provided at one end with a bevel gear 91 that meshes with the gear 75, and at the other end with the clutch member 92. The clutch members 85 and 92 preferably have teeth thereon as shown. The propeller shaft 93 extends through the sleeve 90 and is mounted in thrust bearings 94 and 95 in the gear casing. The sleeve 90 is mounted on roller bearings 96 and 97 on the shaft 93. The shaft 93 is splined or ribbed as shown at 100 and upon this ribbed portion is mounted a sliding clutch member 101, having internal teeth 102, adapted to engage with either clutch member 85 or 92. An extension 103 of the gear casing supports a rod 104, slidable in bearings 105 and 106 thereon, and rigidly secured to the rod 104 within the casing is a yoke 107 that engages with a circumferential groove 108 in the clutch member 101. It is evident that by sliding the rod 104 in its bearings, the gear teeth 102 on the clutch member 101 may be brought into engagement with either gear 85 or 92 at will. It will be seen that gears 75 and 91 and clutch member 92 constitute one driving train, and that gears 74 and 84 and clutch member 85 constitute a second driving train, and that the clutch member 102 is common to both trains.

The slidable rod 104 is connected to shaft 11 by means of a connecting rod 110, which is forked at one end and screw-threaded at the other. The forked end 111 is secured to the rod 104 by the pin 112, and the screw-threaded end is adjustably attached to a forked member 113 by means of the screw-threads 114 and set-nut 115, as indicated in Figs. 1 and 2. The fork member 113 is connected to the crank 117, which is rigidly mounted on the shaft 11, by means of a pin 116. A collar 118 surrounding the shaft 11 extends between the crank 117 and dog 40.

Operation: When the operator desires to use the high speed, it will be necessary to engage the clutch member 102 with clutch member 85, and in order to do this, the rod 104 must be moved toward the rear axle. The switch will first be turned to engage with the contact 66, which closes the circuit from the current source 60 through wire 64, the switch, contact 66, wire 68, electro-magnet 37, wire 70, the frame of the vehicle and wire 62 back to the source of current. The energizing of the electro-magnet 37 attracts the armature 30 of the latch 29 and swings the latch, upwardly in Fig. 1, against the tension of the spring 34. The operator now places his foot upon the pedal 5 and draws the connecting rod 41 forward. This swings the dog 40 forward about the shaft 11, until the dog comes in contact with its latch, after which the latch, together with crank 12, is swung in a counter-clockwise direction about the shaft 11. This moves the rod 110 toward the rear axle, and, through the rod 104 and yoke 107, slides the clutch member 101 into engagement with the clutch member 85 on the sleeve 81, which, by means of its bevel gear 84, drives the gear ring 73. The switch may now be swung to central position to save current. This deënergizes the magnet 37, whereupon the spring 34 withdraws the latch 29 from the path of the dog 40. If, on the other hand, it is desired to use the low speed, it is necessary to engage the clutch member 101 with the clutch member 92 on the inner sleeve 90. The rod 104 must consequently be drawn forward from the rear axle. The switch will be turned into engagement with the contact 65, as shown in Fig. 1. This closes the circuit from the current source through the wire 64, the switch, wire 67, electromagnet 25, wire 69, the frame of the vehicle, and the wire 62, back to the source of current and energizes the magnet 25, which thereupon attracts the armature 19 and swings the latch 18 about the pivot 17 into the path of the dog 39. The operator now pushes forward on the clutch pedal 5, and through the connecting rod 42 swings the dog 39 about the shaft 11, which dog immediately engages with the latch 18. A further movement of the pedal swings the crank 12 in a clockwise direction, as seen in Fig. 1, about the shaft 11, and draws the connecting rod 110 forwardly, which in turn draws the rod 104 forwardly and engages the clutch member 101 with the clutch member 92. Rotation of the propeller shaft 93 now causes the sleeve 90 to drive the rear axle through the medium of bevel gears 91 and 75.

It is apparent that many changes may be made in the details of construction by skilled motor-vehicle builders without departing from the spirit or losing the advantages of my invention. I desire it to be understood, therefore, that this invention is not limited to the specific details shown, but comprises all equivalents thereof that are within the scope of the appended claims.

Having now described my construction, what I claim as my invention and desire to secure by Letters Patent, is:—

1. A speed changing mechanism comprising a movable gear shifting dog, means to move the dog, a latch normally out of the path of the dog, an electro-magnet for drawing the latch into the path of the dog, and an electric circuit for energizing the magnet.

2. A speed changing mechanism comprising a pivoted gear shifting dog, means to swing the dog about its pivot, a latch normally out of the path of the dog, an electro-magnet for drawing the latch into the path of the dog, and an electric circuit for energizing the magnet.

3. A speed changing mechanism comprising a pivoted gear shifting dog, means to swing the dog about its pivot, a pivoted latch normally out of the path of the dog, an electro-magnet for drawing the latch into the path of the pivoted dog, and an electric circuit for energizing the magnet.

4. A speed changing mechanism comprising a movable gear shifting dog, means to move the dog, a pivoted latch adapted to engage with the dog, a spring normally holding the latch out of the path of the dog, an electro-magnet for drawing the latch into the path of the dog, and an electric circuit for energizing the magnet.

5. A speed changing mechanism comprising a movable gear shifting dog, means to move the dog, a pivoted latch adapted to be swung into the path of the dog, a spring normally holding the latch out of the path of the dog, means for limiting the movement that the spring may impart to the latch, an electro-magnet for drawing the latch into the path of the dog, and an electric circuit for energizing the magnet.

6. A speed changing mechanism comprising a movable gear shifting dog, means to move the dog, a pivoted latch adapted to be swung into the path of the dog, means normally holding the latch out of the path of the dog, an armature secured to the latch, an electro-magnet in proximity to the armature for drawing the latch into the path of the dog, and an electric circuit for energizing the magnet.

7. A speed changing mechanism comprising a movable gear shifting dog, means to move the dog, a latch adapted to be moved into the path of the dog, means normally holding the latch out of the path of the dog, and an electro-magnet for drawing the latch into the path of the dog.

8. A speed changing mechanism comprising a lever, a shaft, gear shifting dogs mounted to swing on the shaft, rods connecting the lever with the dogs, a double crank rigidly secured to the shaft, a latch pivoted to each end of the double crank, an armature on each latch, and electro-magnets secured to the double crank whereby one of the latches may be drawn into the path of one of the dogs, a second crank rigidly secured to the shaft, a connecting rod attached to the crank at one end, a sliding bar secured to the other end of the connecting rod and to the common gear of a series of gear trains, whereby the common gear may be moved to engage with either of the gear trains.

9. A speed changing mechanism comprising a lever, a shaft, a gear shifting dog mounted to swing on the shaft, a rod connecting the lever with the dog, a crank rigidly secured to the shaft, a latch pivoted to the crank, an armature secured to the latch, and an electro-magnet secured to the crank whereby the latch may be drawn into the path of the dog, a second crank rigidly secured to the shaft, a connecting rod attached to the crank at one end, a sliding bar secured to the connecting rod at the other end, and to the common gear of a series of gear trains, whereby the common gear may be moved to engage with one of the gear trains.

10. In a speed changing mechanism, a rotatable shaft, a double crank rigidly secured thereto, a pivot attached to one end of the crank, a latch mounted to swing on the pivot, the latch having an armature secured thereto, an electro-magnet attached to the double crank, an actuating member mounted on said shaft and an electric circuit for energizing the magnet to swing the latch into the path of the actuating member.

11. In a speed changing mechanism, a rotatable shaft, a crank rigidly secured thereto, a pivot attached to the crank, a latch mounted to swing on the pivot, the latch having an armature secured thereto, an electro-magnet attached to the crank, an actuating member mounted on said shaft, an electric circuit for energizing the magnet to swing the latch into the path of the actuating member, and a spring for swinging the latch in the opposite direction.

12. In a speed changing mechanism, a rotatable shaft, a crank rigidly secured thereto, a pivot attached to the crank, a latch mounted to swing on the pivot, the latch having an armature thereon, a movable actuating member, an electro-magnet adjustably secured to the crank and an electric circuit for energizing the magnet to swing the latch into the path of the actuating member.

13. In a speed changing mechanism, a movable actuating member, a rotatable shaft, a crank rigidly secured thereon, a pivot projecting laterally from the crank, a latch mounted to swing on the pivot, the latch having an armature thereon, an electro-magnet secured to the crank, a spring attached at one end to the crank, and at the other end to the latch, means for limiting the movement that the spring may impart to the latch, and an electric circuit for energizing the magnet to swing the latch into the path of the actuating member.

14. In a speed changing mechanism, a shaft, a lever mounted on the shaft, a rotatable shaft, a dog thereon mounted to swing about the rotatable shaft, a rod having one end attached to the dog and the other end attached to the lever, so that a movement of the lever causes a corresponding movement of the dog, a crank mounted on the rotatable shaft and rigidly secured thereto, a pivot projecting laterally from the crank, a latch mounted to swing on the pivot, an electro-magnet secured to swing with the crank, and an armature on the latch, an electric circuit for energizing the magnet to swing the latch into the path of the dog, a second crank rigidly mounted on the rotatable shaft, and means connected to the crank for shifting the common member of a series of driving trains.

15. In a speed changing mechanism, a shaft, a lever mounted on the shaft, a rotatable shaft, a dog thereon mounted to swing about the rotatable shaft, a rod having one end attached to the dog and the other end attached to the lever, so that a movement of the lever causes a corresponding movement of the dog, a crank mounted on the rotatable shaft and rigidly secured thereto, a pivot projecting from the crank, a latch mounted to swing on the pivot, a spring connecting the latch with the crank and tending to hold the latch in a given position, an electro-magnet secured to swing with the crank, an armature on the latch, an electric circuit for energizing the magnet to swing the latch in opposition to the force of the spring and into the path of the dog, and means connected to the shaft for moving the common member of a series of driving trains.

16. In a speed changing mechanism, a shaft, a double crank mounted thereon, a pin projecting laterally from each end of the double crank, a latch mounted on each pin, each latch having an armature secured thereto, a spring connecting each latch with the double crank and tending to hold the respective latch in a given position, brackets secured to the double crank, electro-magnets mounted on the brackets, a double-arm actuating member mounted on the shaft, each electro-magnet being adapted to attract the respective armature and to thereby move the corresponding latch against the tension of its spring into the path of one of the arms of the actuating member.

17. In a speed changing mechanism, a shaft, a lever mounted thereon, a rotatable shaft, a dog mounted to swing about the rotatable shaft, a rod having one end attached to the dog and the other end attached to the lever, so that a movement of the lever causes a corresponding movement of the dog, a crank mounted on the rotatable shaft and rigidly secured thereto, a pivot projecting laterally from the crank, a latch mounted to swing on the pivot, means to swing the latch into the path of the dog, and means connected to the rotatable shaft for moving the common member of a series of driving trains.

18. In a speed changing mechanism, a lever, a rotatable shaft, dogs mounted to swing about the rotatable shaft, rods secured to the lever and to the respective dogs, so that a movement of the lever causes a corresponding movement of the dogs, a crank mounted on the rotatable shaft and rigidly secured thereto, said crank having a plurality of arms, a pivot projecting laterally from each of the crank arms, a latch mounted on each pivot, each latch being arranged to swing into the path of one of the dogs, means for swinging each latch into the path of the corresponding dog, and means connected to the rotatable shaft for moving the common member of a series of driving trains.

In testimony whereof I have signed this specification in the presence of two subscribing witnesses.

HERMAN G. C. SCHWARZE.

Witnesses:
ERNEST E. SWEET,
CLAIR B. OWEN.